(12) United States Patent
Stockner

(10) Patent No.: US 8,410,623 B2
(45) Date of Patent: Apr. 2, 2013

(54) WIND POWER ELECTRICITY GENERATING SYSTEM AND RELATIVE CONTROL METHOD

(75) Inventor: Gunther Stockner, Velturno (IT)

(73) Assignee: Wilic S. AR. L., Luxembourg (LU)

( * ) Notice: Subject to any disclaimer, the term of this patent is extended or adjusted under 35 U.S.C. 154(b) by 344 days.

(21) Appl. No.: 12/796,326

(22) Filed: Jun. 8, 2010

(65) Prior Publication Data

US 2011/0140419 A1 Jun. 16, 2011

(30) Foreign Application Priority Data

Jun. 10, 2009 (IT) .............................. MI2009A1029

(51) Int. Cl.
*F03D 9/00* (2006.01)
(52) U.S. Cl. ........................................... 290/44; 290/55
(58) Field of Classification Search .................. 290/44, 290/55
See application file for complete search history.

(56) References Cited

U.S. PATENT DOCUMENTS

| | | |
|---|---|---|
| 1,894,357 A | 1/1933 | Manikowske et al. |
| 1,948,854 A | 2/1934 | Heath |
| 1,979,813 A | 11/1934 | Reis |
| 2,006,172 A | 6/1935 | Klappauf |
| 2,040,218 A | 5/1936 | Soderberg |
| 2,177,801 A | 10/1939 | Erren |
| 2,469,734 A | 5/1949 | Ledwith |
| 2,496,897 A | 2/1950 | Strickland |
| 2,655,611 A | 10/1953 | Sherman |
| 2,739,253 A | 3/1956 | Plumb |
| 2,806,160 A | 9/1957 | Brainard |
| 2,842,214 A | 7/1958 | Prewitt |
| 2,903,610 A | 9/1959 | Bessiere |
| 3,004,782 A | 10/1961 | Meermans |
| 3,072,813 A | 1/1963 | Reijnst et al. |
| 3,083,311 A | 3/1963 | Krasnow |
| 3,131,942 A | 5/1964 | Ertaud |
| 3,168,686 A | 2/1965 | King et al. |
| 3,221,195 A | 11/1965 | Hoffmann |
| 3,363,910 A | 1/1968 | Toronchuk |
| 3,364,523 A | 1/1968 | Schippers |
| 3,392,910 A | 7/1968 | Tanzberger |
| 3,468,548 A | 9/1969 | Webb |
| 3,700,247 A | 10/1972 | Butler et al. |

(Continued)

FOREIGN PATENT DOCUMENTS

| | | |
|---|---|---|
| CA | 2404939 | 4/2004 |
| CA | 2518742 | 9/2004 |

(Continued)

OTHER PUBLICATIONS

Maxime R. Dubous, Henk Polinder, Study of TFPM Machines with Toothed Rotor Applied to Direct-Drive Generators for Wind Turbines, 2004.

(Continued)

*Primary Examiner* — Tho D Ta
(74) *Attorney, Agent, or Firm* — Neal, Gerber & Eisenberg LLP

(57) ABSTRACT

A wind power electricity generating system having a nacelle; a rotary assembly rotating about an axis with respect to the nacelle; and an angular speed detection device having at least one image sensor facing a surface of the rotary assembly.

42 Claims, 3 Drawing Sheets

U.S. PATENT DOCUMENTS

| | | |
|---|---|---|
| 3,724,861 A | 4/1973 | Lesiecki |
| 3,746,349 A | 7/1973 | Smale et al. |
| 3,748,089 A | 7/1973 | Boyer et al. |
| 3,789,252 A | 1/1974 | Abegg |
| 3,841,643 A | 10/1974 | McLean |
| 3,860,843 A | 1/1975 | Kawasaki et al. |
| 3,942,026 A | 3/1976 | Carter |
| 3,963,247 A | 6/1976 | Nommensen |
| 3,968,969 A | 7/1976 | Mayer et al. |
| 4,022,479 A | 5/1977 | Orlowski |
| 4,061,926 A | 12/1977 | Peed |
| 4,087,698 A | 5/1978 | Myers |
| 4,273,343 A | 6/1981 | Visser |
| 4,289,970 A | 9/1981 | Deibert |
| 4,291,235 A | 9/1981 | Bergey, Jr. et al. |
| 4,292,532 A | 9/1981 | Leroux |
| 4,336,649 A | 6/1982 | Glaser |
| 4,339,874 A | 7/1982 | Mc'Carty et al. |
| 4,348,604 A | 9/1982 | Thode |
| 4,350,897 A | 9/1982 | Benoit |
| 4,354,126 A | 10/1982 | Yates |
| 4,368,895 A | 1/1983 | Okamoto et al. |
| 4,398,773 A | 8/1983 | Boden et al. |
| 4,452,046 A | 6/1984 | Valentin |
| 4,482,831 A | 11/1984 | Notaras et al. |
| 4,490,093 A | 12/1984 | Chertok et al. |
| 4,517,483 A | 5/1985 | Hucker et al. |
| 4,517,484 A | 5/1985 | Dacier |
| 4,521,026 A | 6/1985 | Eide |
| 4,585,950 A | 4/1986 | Lund |
| 4,613,779 A | 9/1986 | Meyer |
| 4,638,200 A | 1/1987 | Le Corre et al. |
| 4,648,801 A | 3/1987 | Wilson |
| 4,694,654 A | 9/1987 | Kawamura |
| 4,700,096 A | 10/1987 | Epars |
| 4,714,852 A | 12/1987 | Kawada et al. |
| 4,720,640 A | 1/1988 | Anderson et al. |
| 4,722,661 A | 2/1988 | Mizuno |
| 4,724,348 A | 2/1988 | Stokes |
| 4,761,590 A | 8/1988 | Kaszman |
| 4,792,712 A | 12/1988 | Stokes |
| 4,801,244 A | 1/1989 | Stahl |
| 4,866,321 A | 9/1989 | Blanchard et al. |
| 4,900,965 A | 2/1990 | Fisher |
| 4,906,060 A | 3/1990 | Claude |
| 4,973,868 A | 11/1990 | Wust |
| 4,976,587 A | 12/1990 | Johnston et al. |
| 5,004,944 A | 4/1991 | Fisher |
| 5,063,318 A | 11/1991 | Anderson |
| 5,090,711 A | 2/1992 | Becker |
| 5,091,668 A | 2/1992 | Cuenot et al. |
| 5,177,388 A | 1/1993 | Hotta et al. |
| 5,191,255 A | 3/1993 | Kloosterhouse et al. |
| 5,275,139 A | 1/1994 | Rosenquist |
| 5,280,209 A | 1/1994 | Leupold et al. |
| 5,281,094 A | 1/1994 | McCarty et al. |
| 5,298,827 A | 3/1994 | Sugiyama |
| 5,302,876 A | 4/1994 | Iwamatsu et al. |
| 5,311,092 A | 5/1994 | Fisher |
| 5,315,159 A | 5/1994 | Gribnau |
| 5,331,238 A | 7/1994 | Johnsen |
| 5,410,997 A | 5/1995 | Rosenquist |
| 5,419,683 A | 5/1995 | Peace |
| 5,456,579 A | 10/1995 | Olson |
| 5,483,116 A | 1/1996 | Kusase et al. |
| 5,506,453 A | 4/1996 | McCombs |
| 5,579,800 A | 12/1996 | Walker |
| 5,609,184 A | 3/1997 | Apel et al. |
| 5,663,600 A | 9/1997 | Baek et al. |
| 5,670,838 A | 9/1997 | Everton |
| 5,696,419 A | 12/1997 | Rakestraw et al. |
| 5,704,567 A | 1/1998 | Maglieri |
| 5,746,576 A | 5/1998 | Bayly |
| 5,777,952 A | 7/1998 | Nishimura et al. |
| 5,783,894 A | 7/1998 | Wither |
| 5,793,144 A | 8/1998 | Kusase et al. |
| 5,798,632 A | 8/1998 | Muljadi |
| 5,801,470 A | 9/1998 | Johnson et al. |
| 5,811,908 A | 9/1998 | Iwata et al. |
| 5,814,914 A | 9/1998 | Caamañ |
| 5,844,333 A | 12/1998 | Sheerin |
| 5,844,341 A | 12/1998 | Spooner et al. |
| 5,857,762 A | 1/1999 | Schwaller |
| 5,886,441 A | 3/1999 | Uchida et al. |
| 5,889,346 A | 3/1999 | Uchida et al. |
| 5,894,183 A | 4/1999 | Borchert |
| 5,925,964 A | 7/1999 | Kusase et al. |
| 5,952,755 A | 9/1999 | Lubas |
| 5,961,124 A | 10/1999 | Muller |
| 5,973,435 A | 10/1999 | Irie et al. |
| 5,986,374 A | 11/1999 | Kawakami |
| 5,986,378 A | 11/1999 | Caamañ |
| 6,013,968 A | 1/2000 | Lechner et al. |
| 6,037,692 A | 3/2000 | Miekka et al. |
| 6,064,123 A | 5/2000 | Gislason |
| 6,067,227 A | 5/2000 | Katsui et al. |
| 6,089,536 A | 7/2000 | Watanabe et al. |
| 6,093,984 A | 7/2000 | Shiga et al. |
| 6,127,739 A | 10/2000 | Appa |
| 6,172,429 B1 | 1/2001 | Russell |
| 6,177,746 B1 | 1/2001 | Tupper et al. |
| 6,193,211 B1 | 2/2001 | Watanabe et al. |
| 6,194,799 B1 | 2/2001 | Miekka et al. |
| 6,215,199 B1 | 4/2001 | Lysenko et al. |
| 6,232,673 B1 | 5/2001 | Schoo et al. |
| 6,278,197 B1 | 8/2001 | Appa |
| 6,285,090 B1 | 9/2001 | Brutsaert et al. |
| 6,326,711 B1 | 12/2001 | Yamaguchi et al. |
| 6,365,994 B1 | 4/2002 | Watanabe et al. |
| 6,373,160 B1 | 4/2002 | Schrödl |
| 6,376,956 B1 | 4/2002 | Hosoya |
| 6,378,839 B2 | 4/2002 | Watanabe et al. |
| 6,384,504 B1 | 5/2002 | Elrhart et al. |
| 6,417,578 B1 | 7/2002 | Chapman et al. |
| 6,428,011 B1 | 8/2002 | Oskouei |
| 6,452,287 B1 | 9/2002 | Looker |
| 6,452,301 B1 | 9/2002 | Van Dine et al. |
| 6,455,976 B1 | 9/2002 | Nakano |
| 6,472,784 B2 | 10/2002 | Miekka et al. |
| 6,474,653 B1 | 11/2002 | Hintenlang et al. |
| 6,476,513 B1 | 11/2002 | Gueorguiev |
| 6,483,199 B2 | 11/2002 | Umemoto et al. |
| 6,492,743 B1 | 12/2002 | Appa |
| 6,492,754 B1 | 12/2002 | Weiglhofer et al. |
| 6,499,532 B1 | 12/2002 | Williams |
| 6,504,260 B1 | 1/2003 | Debleser |
| 6,515,390 B1 | 2/2003 | Lopatinsky et al. |
| 6,520,737 B1 | 2/2003 | Fischer et al. |
| 6,548,932 B1 | 4/2003 | Weiglhofer et al. |
| 6,590,312 B1 | 7/2003 | Seguchi et al. |
| 6,603,232 B2 | 8/2003 | Van Dine et al. |
| 6,617,747 B1 | 9/2003 | Petersen |
| 6,629,358 B2 | 10/2003 | Setiabudi et al. |
| 6,664,692 B1 | 12/2003 | Kristoffersen |
| 6,676,122 B1 | 1/2004 | Wobben |
| 6,683,397 B2 | 1/2004 | Gauthier et al. |
| 6,700,260 B2 | 3/2004 | Hsu et al. |
| 6,700,288 B2 | 3/2004 | Smith |
| 6,707,224 B1 | 3/2004 | Petersen |
| 6,720,688 B1 | 4/2004 | Schiller |
| 6,727,624 B2 | 4/2004 | Morita et al. |
| 6,746,217 B2 | 6/2004 | Kim et al. |
| 6,759,758 B2 | 7/2004 | Martinez |
| 6,762,525 B1 | 7/2004 | Maslov et al. |
| 6,781,276 B1 | 8/2004 | Stiesdal et al. |
| 6,784,564 B1 | 8/2004 | Wobben |
| 6,794,781 B2 | 9/2004 | Razzell et al. |
| 6,828,710 B1 | 12/2004 | Gabrys |
| 6,856,042 B1 | 2/2005 | Kubota |
| 6,879,075 B2 | 4/2005 | Calfo et al. |
| 6,888,262 B2 | 5/2005 | Blakemore |
| 6,891,299 B2 | 5/2005 | Coupart et al. |
| 6,903,466 B1 | 6/2005 | Mercier et al. |
| 6,903,475 B2 | 6/2005 | Ortt et al. |
| 6,906,444 B2 | 6/2005 | Hattori et al. |
| 6,911,741 B2 | 6/2005 | Petteersen et al. |
| 6,921,243 B2 | 7/2005 | Canini et al. |

| | | |
|---|---|---|
| 6,931,834 B2 | 8/2005 | Jones |
| 6,933,645 B1 | 8/2005 | Watson |
| 6,933,646 B2 | 8/2005 | Kinoshita |
| 6,942,454 B2 | 9/2005 | Ohlmann |
| 6,945,747 B1 | 9/2005 | Miller |
| 6,949,860 B2 | 9/2005 | Hama et al. |
| 6,951,443 B1 | 10/2005 | Blakemore |
| 6,972,498 B2 | 12/2005 | Jamieson et al. |
| 6,983,529 B2 | 1/2006 | Ortt et al. |
| 6,984,908 B2 | 1/2006 | Rinholm et al. |
| 6,987,342 B2 | 1/2006 | Hans |
| 6,998,729 B1 | 2/2006 | Wobben |
| 7,004,724 B2 | 2/2006 | Pierce et al. |
| 7,008,172 B2 | 3/2006 | Selsam |
| 7,008,348 B2 | 3/2006 | LaBath |
| 7,016,006 B2 | 3/2006 | Song |
| 7,021,905 B2 | 4/2006 | Torrey et al. |
| 7,028,386 B2 | 4/2006 | Kato et al. |
| 7,033,139 B2 | 4/2006 | Wobben |
| 7,038,343 B2 | 5/2006 | Agnes et al. |
| 7,042,109 B2 | 5/2006 | Gabrys |
| 7,057,305 B2 | 6/2006 | Krüger-Gotzmann et al. |
| 7,075,192 B2 | 7/2006 | Bywaters et al. |
| 7,081,696 B2 | 7/2006 | Ritchey |
| 7,088,024 B2 | 8/2006 | Agnes et al. |
| 7,091,642 B2 | 8/2006 | Agnes et al. |
| 7,095,128 B2 | 8/2006 | Canini et al. |
| 7,098,552 B2 | 8/2006 | McCoin |
| 7,109,600 B1 | 9/2006 | Bywaters et al. |
| 7,111,668 B2 | 9/2006 | Rürup |
| 7,116,006 B2 | 10/2006 | McCoin |
| 7,119,469 B2 | 10/2006 | Ortt et al. |
| 7,154,191 B2 | 12/2006 | Jansen et al. |
| 7,161,260 B2 | 1/2007 | Krüger-Gotzmann et al. |
| 7,166,942 B2 | 1/2007 | Yokota |
| 7,168,248 B2 | 1/2007 | Sakamoto et al. |
| 7,168,251 B1 | 1/2007 | Janssen |
| 7,179,056 B2 | 2/2007 | Sieffriedsen |
| 7,180,204 B2 | 2/2007 | Grant et al. |
| 7,183,665 B2 | 2/2007 | Bywaters et al. |
| 7,196,446 B2 | 3/2007 | Hans |
| 7,205,678 B2 | 4/2007 | Casazza et al. |
| 7,217,091 B2 | 5/2007 | LeMieux |
| 7,259,472 B2 | 8/2007 | Miyake et al. |
| 7,281,501 B2 | 10/2007 | Leufen et al. |
| 7,285,890 B2 | 10/2007 | Jones et al. |
| 7,323,792 B2 | 1/2008 | Sohn |
| 7,345,376 B2 | 3/2008 | Costin |
| 7,358,637 B2 | 4/2008 | Tapper |
| 7,377,163 B2 | 5/2008 | Miyagawa |
| 7,385,305 B2 | 6/2008 | Casazza et al. |
| 7,385,306 B2 | 6/2008 | Casazza et al. |
| 7,392,988 B2 | 7/2008 | Moldt et al. |
| 7,427,814 B2 | 9/2008 | Bagepalli et al. |
| 7,431,567 B1 | 10/2008 | Bevington et al. |
| 7,443,066 B2 | 10/2008 | Salamah et al. |
| 7,458,261 B2 | 12/2008 | Miyagawa |
| 7,482,720 B2 | 1/2009 | Gordon et al. |
| 7,548,008 B2 | 6/2009 | Jansen et al. |
| 7,550,863 B2 | 6/2009 | Versteegh |
| 7,687,932 B2 | 3/2010 | Casazza et al. |
| 7,960,850 B2 * | 6/2011 | Rasmussen ............... 290/44 |
| 2002/0047418 A1 | 4/2002 | Seguchi et al. |
| 2002/0047425 A1 | 4/2002 | Coupart et al. |
| 2002/0056822 A1 | 5/2002 | Watanabe et al. |
| 2002/0063485 A1 | 5/2002 | Lee et al. |
| 2002/0089251 A1 | 7/2002 | Tajima et al. |
| 2002/0148453 A1 | 10/2002 | Watanabe et al. |
| 2003/0011266 A1 | 1/2003 | Morita et al. |
| 2003/0102677 A1 | 6/2003 | Becker et al. |
| 2003/0137149 A1 | 7/2003 | Northrup et al. |
| 2003/0230899 A1 | 12/2003 | Martinez |
| 2004/0086373 A1 | 5/2004 | Page, Jr. |
| 2004/0094965 A1 | 5/2004 | Kirkegaard et al. |
| 2004/0119292 A1 | 6/2004 | Datta et al. |
| 2004/0150283 A1 | 8/2004 | Calfo et al. |
| 2004/0151575 A1 | 8/2004 | Pierce et al. |
| 2004/0151577 A1 | 8/2004 | Pierce et al. |
| 2004/0189136 A1 | 9/2004 | Kolomeitsev et al. |
| 2005/0002783 A1 | 1/2005 | Hiel et al. |
| 2005/0002787 A1 | 1/2005 | Wobben |
| 2005/0082839 A1 | 4/2005 | McCoin |
| 2005/0230979 A1 | 10/2005 | Bywaters et al. |
| 2005/0280264 A1 | 12/2005 | Nagy |
| 2006/0000269 A1 | 1/2006 | LeMieux et al. |
| 2006/0001269 A1 | 1/2006 | Jansen et al. |
| 2006/0006658 A1 | 1/2006 | McCoin |
| 2006/0012182 A1 | 1/2006 | McCoin |
| 2006/0028025 A1 | 2/2006 | Kikuchi et al. |
| 2006/0066110 A1 | 3/2006 | Jansen et al. |
| 2006/0071575 A1 | 4/2006 | Jansen et al. |
| 2006/0091735 A1 | 5/2006 | Song et al. |
| 2006/0125243 A1 | 6/2006 | Miller |
| 2006/0131985 A1 | 6/2006 | Qu et al. |
| 2006/0152012 A1 | 7/2006 | Wiegel et al. |
| 2006/0152015 A1 | 7/2006 | Bywaters et al. |
| 2006/0152016 A1 | 7/2006 | Bywaters et al. |
| 2007/0020109 A1 | 1/2007 | Takahashi et al. |
| 2007/0116567 A1 | 5/2007 | Luetze |
| 2007/0187954 A1 | 8/2007 | Struve et al. |
| 2007/0187956 A1 | 8/2007 | Wobben |
| 2007/0222223 A1 | 9/2007 | Bagepalli et al. |
| 2007/0222226 A1 | 9/2007 | Casazza et al. |
| 2007/0222227 A1 | 9/2007 | Casazza et al. |
| 2008/0003105 A1 | 1/2008 | Nies |
| 2008/0025847 A1 | 1/2008 | Teipen |
| 2008/0050234 A1 | 2/2008 | Ingersoll et al. |
| 2008/0107526 A1 | 5/2008 | Wobben |
| 2008/0118342 A1 | 5/2008 | Seidel et al. |
| 2008/0197636 A1 | 8/2008 | Tilscher et al. |
| 2008/0197638 A1 | 8/2008 | Wobben |
| 2008/0246224 A1 | 10/2008 | Pabst et al. |
| 2008/0290664 A1 | 11/2008 | Kruger |
| 2008/0303281 A1 | 12/2008 | Krueger |
| 2008/0309189 A1 | 12/2008 | Pabst et al. |
| 2008/0315594 A1 | 12/2008 | Casazza et al. |
| 2009/0045628 A1 | 2/2009 | Erdman et al. |
| 2009/0060748 A1 | 3/2009 | Landa et al. |
| 2009/0094981 A1 | 4/2009 | Eggleston |
| 2009/0096309 A1 | 4/2009 | Pabst et al. |
| 2009/0302702 A1 | 12/2009 | Pabst et al. |
| 2010/0019502 A1 | 1/2010 | Pabst et al. |
| 2010/0026010 A1 | 2/2010 | Pabst |
| 2010/0117362 A1 | 5/2010 | Vihriala et al. |
| 2010/0123318 A1 | 5/2010 | Casazza et al. |
| 2010/0260603 A1 * | 10/2010 | Dawson et al. ............... 416/87 |

FOREIGN PATENT DOCUMENTS

| | | |
|---|---|---|
| CN | 1554867 | 12/2004 |
| DE | 1130913 | 6/1962 |
| DE | 2164135 | 7/1973 |
| DE | 2322458 | 11/1974 |
| DE | 2506160 | 8/1976 |
| DE | 2922885 | 12/1980 |
| DE | 3638129 | 5/1988 |
| DE | 3718954 | 12/1988 |
| DE | 3844505 | 7/1990 |
| DE | 3903399 | 8/1990 |
| DE | 4304577 | 8/1994 |
| DE | 4402184 | 8/1995 |
| DE | 4415570 | 11/1995 |
| DE | 4444757 | 6/1996 |
| DE | 29706980 | 7/1997 |
| DE | 19636591 | 3/1998 |
| DE | 19644355 | 4/1998 |
| DE | 19652673 | 6/1998 |
| DE | 19711869 | 9/1998 |
| DE | 19748716 | 11/1998 |
| DE | 29819391 | 2/1999 |
| DE | 19801803 | 4/1999 |
| DE | 19932394 | 1/2001 |
| DE | 19947915 | 4/2001 |
| DE | 19951594 | 5/2001 |
| DE | 10000370 | 7/2001 |
| DE | 20102029 | 8/2001 |
| DE | 10219190 | 11/2003 |
| DE | 10246690 | 4/2004 |
| DE | 102004018524 | 11/2005 |

| | | | | | | |
|---|---|---|---|---|---|---|
| DE | 102004028746 | 12/2005 | | JP | 2003453072 | 7/2003 |
| EP | 0013157 | 7/1980 | | JP | 2004-153913 | 5/2004 |
| EP | 0232963 | 8/1987 | | JP | 2004-297947 | 10/2004 |
| EP | 0313392 | 4/1989 | | JP | 2005-006375 | 1/2005 |
| EP | 0627805 | 12/1994 | | JP | 2005-020906 | 1/2005 |
| EP | 1108888 | 6/2001 | | JP | 2005-312150 | 11/2005 |
| EP | 1167754 | 1/2002 | | NL | 8902534 | 5/1991 |
| EP | 1289097 | 3/2003 | | NZ | 528743 | 2/2007 |
| EP | 1291521 | 3/2003 | | RU | 2000466 | 9/1993 |
| EP | 1309067 | 5/2003 | | RU | 2229621 | 5/2004 |
| EP | 1363019 | 11/2003 | | WO | WO8402382 | 6/1984 |
| EP | 1375913 | 1/2004 | | WO | WO9105953 | 5/1991 |
| EP | 1394406 | 3/2004 | | WO | WO9212343 | 7/1992 |
| EP | 1394451 | 3/2004 | | WO | WO9730504 | 8/1997 |
| EP | 1589222 | 10/2005 | | WO | WO9733357 | 9/1997 |
| EP | 1612415 | 1/2006 | | WO | WO9840627 | 9/1998 |
| EP | 1641102 | 3/2006 | | WO | WO9930031 | 6/1999 |
| EP | 1677002 | 7/2006 | | WO | WO9933165 | 7/1999 |
| EP | 1772624 | 4/2007 | | WO | WO9937912 | 7/1999 |
| EP | 1780409 | 5/2007 | | WO | WO9939426 | 8/1999 |
| EP | 1829762 | 9/2007 | | WO | WO0001056 | 1/2000 |
| EP | 1921311 | 5/2008 | | WO | WO0106121 | 1/2001 |
| EP | 2060786 | 5/2009 | | WO | WO0106623 | 1/2001 |
| ES | 2140301 | 2/2000 | | WO | WO0107784 | 2/2001 |
| FR | 806292 | 12/1936 | | WO | WO0121956 | 3/2001 |
| FR | 859844 | 12/1940 | | WO | WO0125631 | 4/2001 |
| FR | 1348765 | 1/1964 | | WO | WO0129413 | 4/2001 |
| FR | 2401091 | 3/1979 | | WO | WO0134973 | 5/2001 |
| FR | 2445053 | 7/1980 | | WO | WO0135517 | 5/2001 |
| FR | 2519483 | 7/1983 | | WO | WO0169754 | 9/2001 |
| FR | 2594272 | 8/1987 | | WO | WO0233254 | 4/2002 |
| FR | 2760492 | 9/1998 | | WO | WO02057624 | 7/2002 |
| FR | 2796671 | 1/2001 | | WO | WO02083523 | 10/2002 |
| FR | 2798168 | 3/2001 | | WO | WO03036084 | 5/2003 |
| FR | 2810374 | 12/2001 | | WO | WO03067081 | 8/2003 |
| FR | 2 882 404 | 8/2006 | | WO | WO03076801 | 9/2003 |
| FR | 2882404 | 8/2006 | | WO | WO2004017497 | 2/2004 |
| GB | 191317268 | 3/1914 | | WO | WO2005103489 | 11/2005 |
| GB | 859176 | 1/1961 | | WO | WO2006013722 | 2/2006 |
| GB | 1524477 | 9/1978 | | WO | WO2006032515 | 3/2006 |
| GB | 1537729 | 1/1979 | | WO | WO2007063370 | 6/2007 |
| GB | 2041111 | 9/1980 | | WO | WO2007110718 | 10/2007 |
| GB | 2050525 | 1/1981 | | WO | WO2008052562 | 5/2008 |
| GB | 2075274 | 11/1981 | | WO | WO2008078342 | 7/2008 |
| GB | 2131630 | 6/1984 | | WO | WO2008086608 | 7/2008 |
| GB | 2144587 | 3/1985 | | WO | WO2008098573 | 8/2008 |
| GB | 2208243 | 3/1989 | | WO | WO2008102184 | 8/2008 |
| GB | 2266937 | 11/1993 | | WO | WO2008116463 | 10/2008 |
| GB | 2372783 | 9/2002 | | WO | WO2008131766 | 11/2008 |
| JP | 57059462 | 4/1982 | | | | |
| JP | 3145945 | 6/1991 | | | | |
| JP | 5122912 | 5/1993 | | | | |
| JP | 6002970 | 1/1994 | | | | |
| JP | 6269141 | 9/1994 | | | | |
| JP | 10-070858 | 3/1998 | | | | |
| JP | 11236977 | 8/1999 | | | | |
| JP | 11-299197 | 10/1999 | | | | |
| JP | 2000-134885 | 5/2000 | | | | |
| JP | 2001-057750 | 2/2001 | | | | |

OTHER PUBLICATIONS

Variable Speed Gearless Wind Turbine (website), http://www.mhi.cojp/msmw/mw/en/gearless.html, viewed on Sep. 22, 2006.

Intellectual Property Office of New Zealand Examination Report dated Jun. 14, 2010 for Patent Application No. 586016.

* cited by examiner

WIND POWER ELECTRICITY GENERATING SYSTEM AND RELATIVE CONTROL METHOD

PRIORITY CLAIM

This application claims the benefit of and priority to Italian Patent Application No. MI2009A 001029, filed on Jun. 10, 2009, the entire contents of which are incorporated herein.

BACKGROUND

Known wind power electricity generating systems comprise a hub; a number of blades fitted to the hub; and an electric machine comprising a stator and a rotor.

In actual use of these wind power electricity generating systems, the wind blows on the blades to rotate the hub about the axis, and so transfer the kinetic energy of the wind to the hub; and rotation of the hub is transferred to the electric machine, in particular to the rotor which is connected to and rotates with the hub about the axis.

The hub, blades, and rotor define the rotary assembly.

In these known wind power electricity generating systems, the angular speed of the rotary assembly must be detected to control the wind power system. More specifically, the angular speed of the rotor must be detected to control an inverter coupled to the electric machine, and/or to control the pitch of the blades with respect to the wind, and/or to calculate the power coefficient of the system, and/or to monitor system operation and efficiency, and/or to keep within a maximum angular speed.

The angular speed detection device most commonly employed in wind power systems is an encoder, of which there are various known types. The most commonly used are incremental and absolute encoders, which comprise a photodetector or proximity sensor.

Known incremental and absolute encoders comprise a disk, the lateral face of which has at least one succession of holes arranged in at least one circle; and a device for detecting the holes. The disk is fixed to the rotary assembly, and the hole detecting device is fixed to the nacelle.

One known incremental encoder disk has at least one succession of equally spaced holes, and the hole detecting device comprises at least one proximity sensor alongside the disk, or at least one light source and at least one photodetector on either side of the disk.

As the disk rotates, the hole detecting device detects the holes and generates a signal indicating the angular distance travelled and the angular speed of the disk, and therefore of the rotary assembly.

Some known incremental encoders have at least two proximity sensors or at least two photodetectors, and holes arranged in at least two circles, and detect the rotation direction of the disk.

In known absolute encoders, on the other hand, the holes are arranged unevenly in a given configuration in at least two circles, and the hole detecting device comprises at least two photodetectors or at least two proximity sensors. Absolute encoders process the signals from the proximity sensors or photodetectors to determine angular position with respect to a fixed reference.

One problem of using such known encoders in direct-transmission wind power systems lies in the encoder requiring a large disk fixed to the rotary assembly.

In some known direct-transmission wind power systems, the rotor and hub are hollow, are connected directly to each other, and have inside diameters allowing access by workers to the inside for maintenance or inspection. In such cases, using an encoder calls for a disk fixed to the rotary assembly and large enough to permit easy access, which poses two problems: the weight of the disk itself, and the precision with which the holes are formed, which affects the accuracy with which angular speed is determined. Moreover, encoders are sensitive to vibration caused by the blades; and the holes are subject to clogging by dirt, thus impairing reliability of the hole detecting device.

SUMMARY

The present disclosure relates to a wind power electricity generating system and relative control method.

More specifically, the present disclosure relates to a wind power electricity generating system comprising a nacelle; a rotary assembly rotating about an axis with respect to the nacelle; and an angular speed detection device for detecting the angular speed of the rotary assembly.

It is thus an object of the present disclosure to provide a wind power system equipped with an angular speed detection device designed to eliminate the drawbacks of the known art.

According to one embodiment of the present disclosure, there is provided a wind power electricity generating system comprising a nacelle; a rotary assembly rotating about an axis with respect to the nacelle; and an angular speed detection device for detecting the angular speed of the rotary assembly; the wind power system being characterized in that the angular speed detection device comprises at least one image sensor facing a surface of the rotary assembly.

Using an image sensor as described herein, the rotary assembly need no longer be equipped with a disk with at least one succession of holes. In fact, any existing surface of the rotary assembly can be used in combination with the image sensor to detect angular speed, and can therefore be selected on the grounds of simplifying installation of the image sensor.

In one embodiment, the image sensor is fixed to the nacelle to acquire images of portions of the surface of the rotary assembly; said surface being an annular or cylindrical surface.

In another embodiment, the surface of the rotary assembly has non-uniform optical properties.

It is a further object of the present disclosure to provide a method of controlling a wind power system, designed to eliminate the drawbacks of the known art.

According to certain embodiments of the present disclosure, there is provided a method of controlling a wind power electricity generating system; the wind power system comprising a nacelle, and a rotary assembly rotating about an axis with respect to the nacelle; and the method being characterized by comprising the steps of acquiring images of a surface of the rotary assembly; and determining the angular speed of the rotary assembly on the basis of the acquired images.

Additional features and advantages are described in, and will be apparent from, the following Detailed Description and the figures.

BRIEF DESCRIPTION OF THE DRAWINGS

A non-limiting embodiment of the present disclosure will be described by way of example with reference to the accompanying drawings, in which.

DETAILED DESCRIPTION

Figure 1:
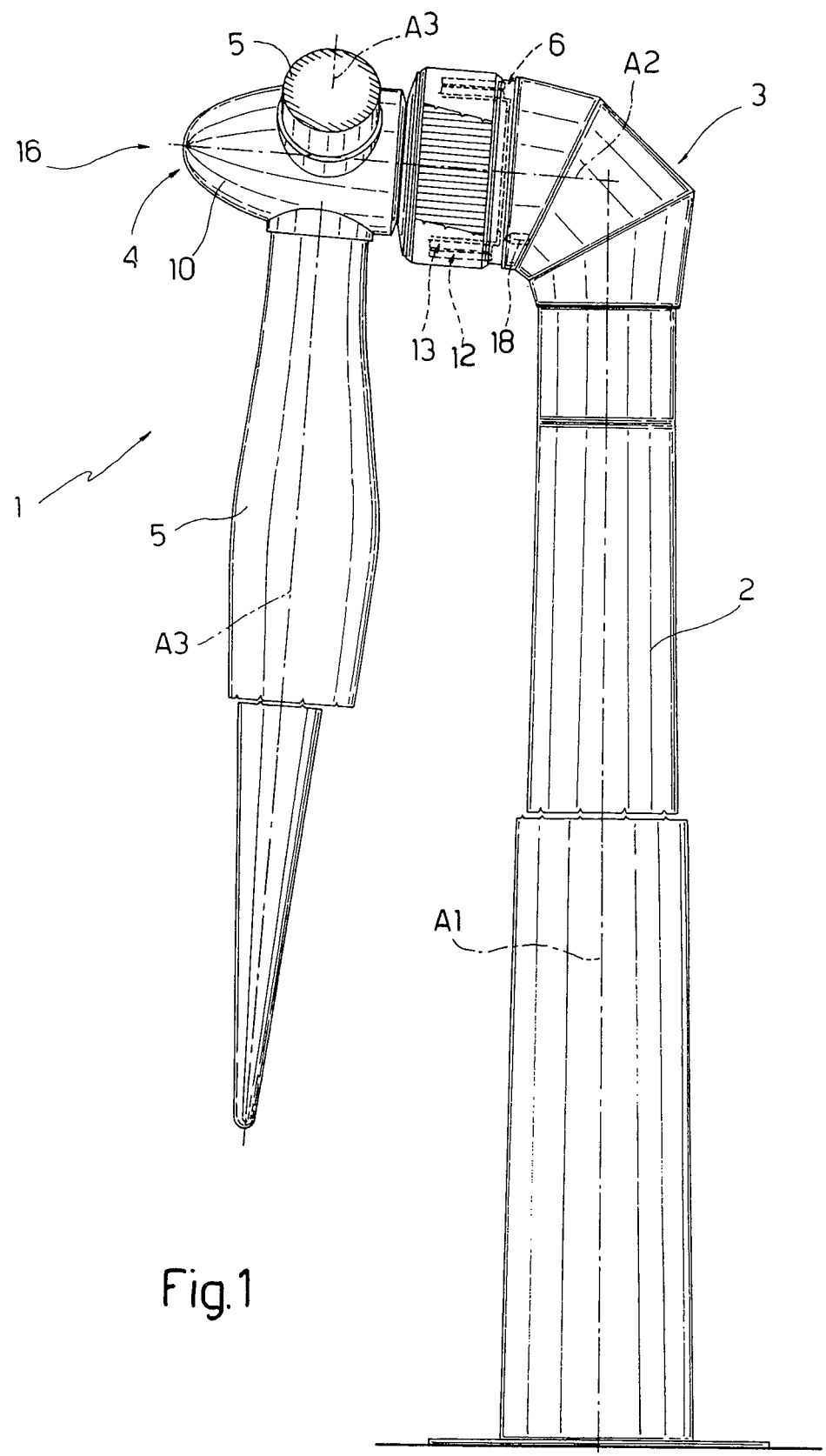
FIG. 1 shows a partly sectioned side view, with parts removed for clarity, of a wind power system in accordance with the present disclosure.
Figure 2:
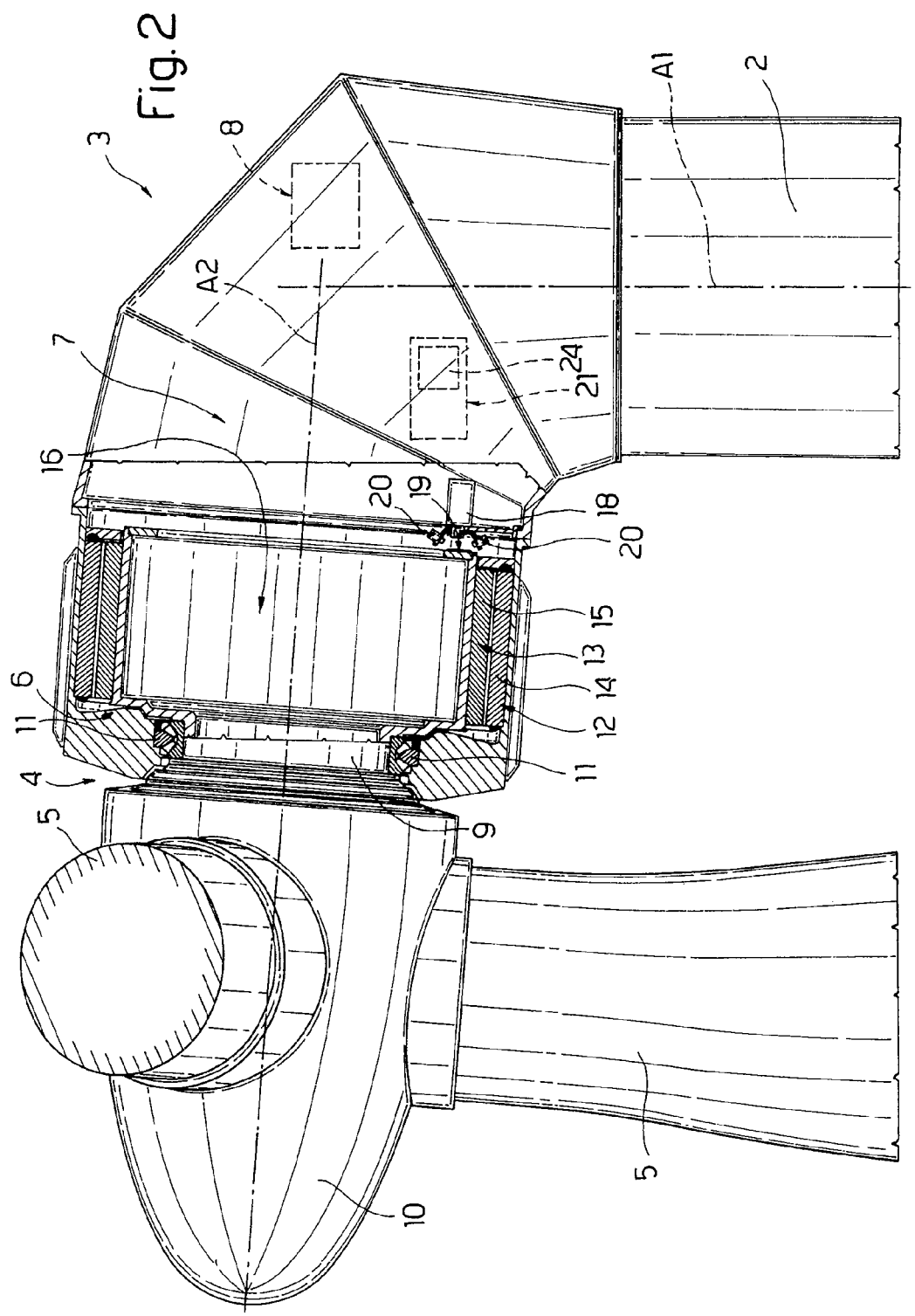
FIG. 2 shows a larger-scale, partly sectioned side view, with parts removed for clarity, of a detail of the FIG. 1 wind power system.
Figure 3:
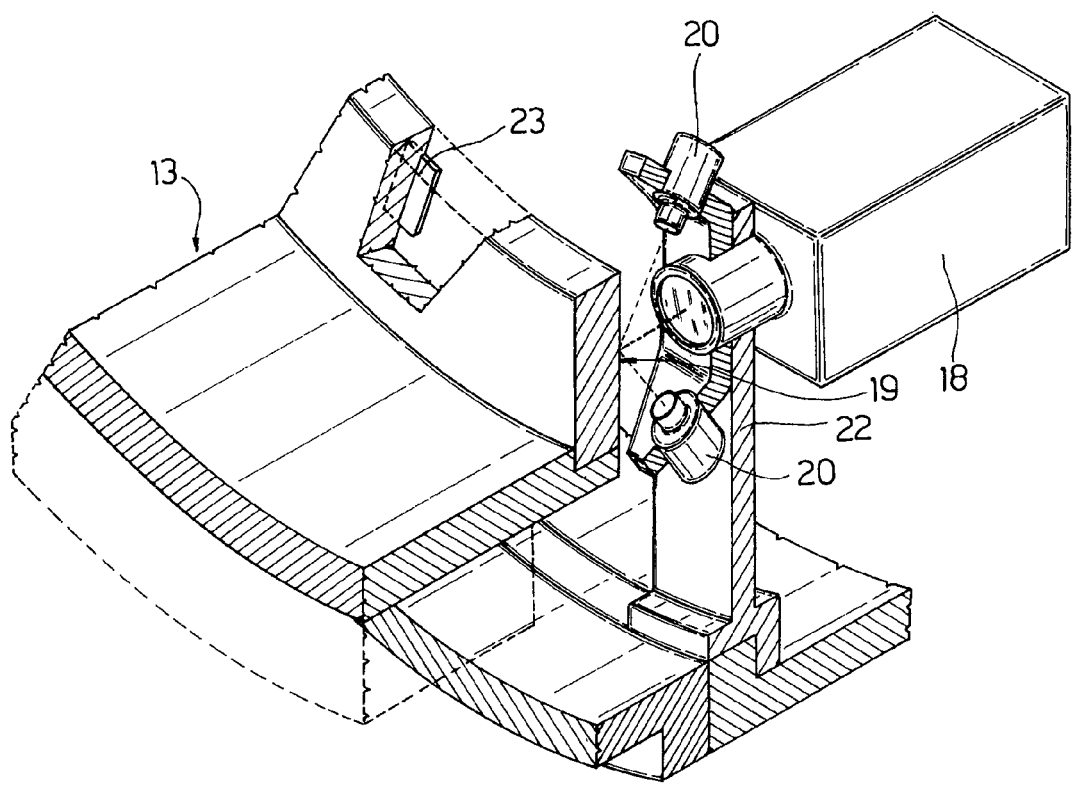
FIG. 3 shows a larger-scale, partly sectioned view in perspective, with parts removed for clarity, of a detail of the FIG. 1 wind power system.

Referring now to the example embodiments of the present disclosure illustrated in FIGS. 1 to 3, number 1 in FIG. 1 indicates a wind power electricity generating system.

In the example shown, system 1 is a variable-angular-speed, direct-transmission wind power system.

Wind power system 1 comprises a pylon 2, a nacelle 3, a hub 4, three blades 5, an electric machine 6, an angular speed detection device 7 (FIG. 2), and a control device 8 (FIG. 2).

The three blades 5 are fitted to hub 4, which in turn is fitted to nacelle 3, which in turn is fitted to pylon 2.

Nacelle 3 is mounted to rotate about an axis Al with respect to pylon 2 to position blades 5 facing the wind; hub 4 is mounted to rotate about an axis A2 with respect to nacelle 3; and each blade 5 is mounted to rotate about a respective axis A3 with respect to hub 4.

With reference to FIG. 2, hub 4 comprises a hollow shaft 9 and a body 10, which are connected rigidly to each other and have inside diameters large enough to permit worker access to the inside for maintenance and/or inspection.

Hollow shaft 9 is fitted, on bearings 11, to nacelle 3 and connected directly to electric machine 6.

Electric machine 6 comprises a stator 12 and a rotor 13. Stator 12 defines a portion of nacelle 3 and comprises stator windings 14; and rotor 13 is hollow, comprises permanent magnets 15, and is fixed directly to hollow shaft 9.

In the example shown, electric machine 6 is synchronous.

The wind rotates hub 4 about axis A2; rotation of hub 4 is transferred to and so rotates rotor 13 about axis A2; and the relative movement of permanent magnets 15 with respect to stator windings 14—in the form of rotation of rotor 13 at variable angular speed—induces voltage at the terminals of stator windings 14.

Hub 4, blades 5, and rotor 13 are integral with one another, and define a rotary assembly 16 which rotates about axis A2 with respect to nacelle 3.

With reference to FIG. 1, the pitch of each blade 5 with respect to the wind is controlled by rotating blade 5 about respective axis A3 to adjust the surface of incidence with respect to the wind. In the example shown, each axis A3 is substantially perpendicular to and radial with respect to axis A2. Rotation of each blade 5 about respective axis A3 is controlled on the basis of efficiency parameters of wind power system 1, so as to keep rotary assembly 16 within a maximum angular speed.

Angular speed is detected by angular speed detection device 7 (FIG. 2).

With reference to FIGS. 2 and 3, angular speed detection device 7 comprises an image sensor 18 facing a surface 19 of rotary assembly 16; two light sources 20; and an image processing unit 21 (FIG. 2).

In the embodiment illustrated in the FIG. 3 example, image sensor 18 is a television camera, which is fitted to a support 22 fixed to nacelle 3 (FIG. 2), and is housed inside nacelle 3, close to electric machine 6 (FIG. 2).

The television camera is positioned to acquire images of portions of surface 19 of rotor 13. In FIGS. 2 and 3, surface 19 is an annular surface of rotor 13, located at the end of permanent magnets 15.

In an alternative embodiment (not shown in the attached drawings), surface 19 is cylindrical.

In one embodiment, surface 19 is a surface with non-uniform optical properties, such as a rough and uneven surface.

In other embodiments, surface 19 is coated, such as to enhance the roughness of surface 19, or with a coating of uneven color. In one such embodiment, the coating may be of paint.

Light sources 20 are positioned adjacent to image sensor 18 and facing surface 19, and may each be of any type, including but not limited to, an incandescent lamp, a fluorescent lamp, a halogen lamp, one or more LEDs, or a laser.

More specifically, light sources 20 are located on opposite sides of image sensor 18 and positioned so the light beams emitted converge on an area of surface 19 covered by image sensor 18. More specifically, light sources 20 are equidistant from image sensor 18. Moreover, light sources 20 are equidistant from the area of surface 19 covered by image sensor 18.

With reference to FIGS. 2 and 3, image sensor 18 is coupled to image processing unit 21 to acquire images at a given acquisition rate (frames/sec), and transmit them to image processing unit 21. More specifically, each image is acquired in digital form and defined by a matrix of pixels; and the acquisition rate is determined on the basis of the maximum angular speed of rotor 13, and more specifically so that, when rotor 13 rotates at maximum angular speed, two consecutively acquired images overlap.

Image processing unit 21 processes the images using an image processing algorithm.

The image processing algorithm determines, in overlapping images, image elements corresponding to the same portion of surface 19, (i.e., determines different sets of pixels representing the same portion of surface 19 in overlapping images).

The image processing algorithm then determines displacement of the image elements corresponding to the same portion of surface 19 in overlapping images.

The displacement is broken down into a radial component with respect to axis A2, and a tangential component perpendicular to the radial component.

From the tangential component, image processing unit 21 determines the angular distance travelled by rotor 13 in the time lapse between acquisition of the processed images containing the corresponding image elements, and, on the basis of the acquisition rate, calculates the angular speed of rotary assembly 16.

Image processing unit 21 also determines the rotation direction of rotary assembly 16 from the tangential component.

From the radial component, image processing unit 21 calculates the relative displacement of rotor 13 with respect to stator 12 and radially with respect to axis A2.

In one embodiment, angular speed detection device 7 also comprises a marker 23, which is defined by an appropriately colored, such as an even-colored, body fixed to surface 19, or by a small reflector fixed to surface 19, or by a small, appropriately painted area of surface 19.

Marker 23 indicates an angular position of rotor 13 with respect to an assumed reference.

Image processing unit 21 comprises a memory 24, in which are stored the angular position, indicated by marker 23, of rotor 13 with respect to the assumed reference, and an image of marker 23. The image acquired by image sensor 18 is compared with the image of marker 23, and, if they match, image processing unit 21 records passage of marker 23, and determines the angular position of rotary assembly 16 with respect to the assumed reference on the basis of the angular distance—determined as described above—traveled by rotor 13 since the passage of marker 23.

Image processing unit 21 therefore provides measurements of the angular speed, radial displacement, and angular position of rotary assembly 16.

With reference to FIG. 2, angular speed detection device 7 is coupled to control device 8 of wind power system 1.

Control device 8 controls wind power system 1 on the basis of the angular speed and/or angular position of rotary assembly 16 supplied by angular speed detection device 7. The control functions performed by control device 8 include: monitoring correct operation of wind power system 1; controlling blade pitch with respect to the wind; calculating the power coefficient of wind power system 1; controlling an inverter coupled to electric machine 6; controlling the efficiency of wind power system 1; indicating radial displacement of rotor 13 with respect to stator 12; and keeping rotary assembly 16 within the maximum angular speed.

Control device 8 also processes the angular speed and/or angular position of rotary assembly 16 by fast Fourier transform (FFT) to determine events.

In one embodiment, additional communication devices (not shown in the drawings) are associated with control device 8 of wind power system 1 to transmit the angular speed and/or angular position of rotary assembly 16 to a remote control centre (not shown in the drawings) coupled by cable or radio to wind power system 1.

In a different embodiment (not shown) of the present disclosure, the permanent magnets of the rotor are replaced with conducting bars arranged about the rotor, parallel to the rotor axis, and joined by two rings of conducting material to form a so-called squirrel cage; and the electric machine is asynchronous.

Clearly, changes may be made to the system and method as described herein without, however, departing from the scope of the accompanying Claims. Thus, it should be understood that various changes and modifications to the presently preferred embodiments described herein will be apparent to those skilled in the art, for example, to the shape of the inflatable annular structures or to the means of connecting them. Such changes and modifications can be made without departing from the spirit and scope of the present subject matter and without diminishing its intended advantages. It is therefore intended that such changes and modifications be covered by the appended claims.

The invention is claimed as follows:

1. A wind power electricity generating system comprising:
a nacelle;
a rotary assembly rotatable about an axis with respect to the nacelle; and
a rotary assembly angular speed detection device fixed to the nacelle and including at least one image sensor facing a surface of the rotary assembly.

2. The wind power electricity generating system of claim 1, wherein the image sensor acquires a plurality of images of a plurality of portions of the surface of the rotary assembly.

3. The wind power electricity generating system of claim 2, wherein said surface is selected from the group consisting of: an annular surface and a cylindrical surface.

4. The wind power electricity generating system of claim 1, wherein the surface of the rotary assembly has a plurality of non-uniform optical properties.

5. The wind power electricity generating system of claim 1 wherein the rotary assembly angular speed detection device includes at least one light source facing said surface, said at least one light source illuminates an area of the surface covered by the image sensor.

6. The wind power electricity generating system of claim 5, wherein the light source is selected from the group consisting of: at least one incandescent lamp, at least one fluorescent lamp, at least one halogen lamp, at least one LED, and at least one laser.

7. The wind power electricity generating system of claim 1, wherein the image sensor acquires a plurality of images at an acquisition rate, and the rotary assembly angular speed detection device includes an image processing unit coupled to the image sensor, said image processing unit processes at least two of any overlapping images.

8. The wind power electricity generating system of claim 7, wherein the acquisition rate is such that, when the rotary assembly rotates at a maximum angular speed, two consecutively acquired images overlap.

9. The wind power electricity generating system of claim 7, wherein the image processing unit determines: (i) a plurality of matching image elements in said overlapping images, and (ii) an angular distance traveled by the rotary assembly in the time lapse between the acquisition of the overlapping images.

10. The wind power electricity generating system of claim 9, wherein the image processing unit determines a rotation direction of the rotary assembly.

11. The wind power electricity generating system of claim 9, wherein the image processing unit determines the angular speed of the rotary assembly based on the determined angular distance and the acquisition rate.

12. The wind power electricity generating system of claim 9, wherein the angular speed detection device includes a marker on the surface of the rotary assembly, and the image processing unit includes a memory storing at least one image of the marker.

13. The wind power electricity generating system of claim 12, wherein the image processing unit: (i) compares the images acquired by the image sensor with the at least one stored image of the marker to determine a passage of the marker, and (ii) determines an angular position of the rotary assembly based on the angular distance traveled by the rotary assembly since the passage of the marker.

14. The wind power electricity generating system of claim 7, wherein the image processing unit determines a radial displacement of the rotary assembly with respect to the axis.

15. A wind power electricity generating system angular speed detection device comprising:
at least one image sensor fixed to a nacelle and facing a surface of a rotary assembly rotatable rotate about an axis with respect to the nacelle, said at least one image sensor acquires a plurality of images of a plurality of portions of the surface of the rotary assembly at an acquisition rate;
at least one light source facing said surface, said at least one light source and configured to illuminate an area of the surface covered by the image sensor; and
an image processing unit coupled to the image sensor, said image processing unit processes at least two of any overlapping acquired images to detect an angular speed of the rotary assembly.

16. The wind power electricity generating system angular speed detection device of claim 15, wherein the acquisition rate is such that, when the rotary assembly rotates at a maximum angular speed, two consecutively acquired images overlap.

17. The wind power electricity generating system angular speed detection device of claim 15, wherein the image processing unit determines: (i) a plurality of matching image elements in said overlapping images, and (ii) an angular distance traveled by the rotary assembly in the time lapse between the acquisition of the overlapping images.

18. The wind power electricity generating system angular speed detection device of claim 17, wherein the image processing unit determines a rotation direction of the rotary assembly.

19. The wind power electricity generating system angular speed detection device of claim 17, wherein the image processing unit determines the angular speed of the rotary assembly based on the determined angular distance and the acquisition rate.

20. The wind power electricity generating system angular speed detection device of claim 15, wherein the image processing unit determines a radial displacement of the rotary assembly with respect to the axis.

21. A method of controlling a wind power electricity generating system including a nacelle and a rotary assembly rotatable about an axis with respect to the nacelle and a rotary assembly angular speed detection device, said method comprising:
(a) acquiring a plurality of images of a surface of the rotary assembly by the rotary assembly angular speed detection device fixed to the nacelle;
(b) determining an angular speed of the rotary assembly based on the acquired images; and
(c) controlling the wind power electricity generating system based on the determined angular speed of the rotary assembly.

22. The method of claim 21, which includes illuminating the surface with at least one light source selected from the group consisting of: at least one incandescent lamp, at least one fluorescent lamp, at least one halogen lamp, at least one LED, and at least one laser.

23. The method of claim 21, which includes coating the surface such that the surface has a plurality of non-uniform optical properties.

24. The method of claim 21, which includes determining an angular distance traveled by the rotary assembly.

25. The method of claim 24, which includes:
(i) acquiring and storing an image of a marker on the surface of the rotary assembly;
(ii) comparing the images acquired by the image sensor with the stored image of the marker;
(iii) determining a passage of the marker; and
(iv) determining an angular position of the rotary assembly based on the angular distance traveled by the rotary assembly since the passage of the marker.

26. The method of claim 21, which includes determining a radial displacement of the rotary assembly with respect to the axis.

27. The method of claim 21, which includes processing the acquired images to determine a rotation direction of the rotary assembly.

28. The wind power electricity generating system of claim 1, wherein the image sensor is a television camera.

29. A wind power electricity generating system comprising:
a nacelle;
a rotary assembly rotatable about an axis with respect to the nacelle; and
a rotary assembly angular speed detection device fixed to the nacelle and including:
a television camera facing a surface of the rotary assembly, said television camera acquires a plurality of images at an acquisition rate, and
an image processing unit coupled to the television camera, said image processing unit receives the plurality of images processes at least two of any overlapping images and determines a displacement of the rotary assembly.

30. The wind power electricity generating system of claim 29, wherein the image processing unit determines: (i) a plurality of matching image elements in said overlapping images, and (ii) a displacement of the matching image elements.

31. The wind power electricity generating system of claim 30, wherein the image processing unit determines: (i) an tangential component of the determined displacement of the matching image elements, and (ii) an angular distance traveled by the rotary assembly in the time lapse between the acquisition of the overlapping images by the tangential component of said determined displacement of the matching image elements.

32. The wind power electricity generating system of claim 31, including a control device that processes the angular distance to determine a plurality of events.

33. The wind power electricity generating system of claim 30, wherein the image processing unit determines: (i) a radial component of the determined displacement of the matching image elements, and (ii) a radial displacement of the rotary assembly with respect to the axis by the radial component of the determined displacement of the matching image elements.

34. The wind power electricity generating system of claim 33, including a control device that processes the radial displacement of the rotary assembly with respect to the axis to determine a plurality of events.

35. The wind power electricity generating system of claim 29, including a control device that transmits, via one of a cable or a radio signal, the determined displacement of the rotary assembly to a remote control centre.

36. A method of controlling a wind power electricity generating system including a nacelle, a rotary assembly rotatable about an axis with respect to the nacelle and a television camera, said method comprising:
(a) acquiring a plurality of images of a surface of the rotary assembly by the television camera fixed to the nacelle;
(b) processing at least two of any overlapping images of the surface of the rotary assembly; and
(c) determining a displacement of the rotary assembly.

37. The method of claim 36, which includes:
(i) determining a plurality of matching image elements in said overlapping images, and
(ii) determining a displacement of the matching image elements.

38. The method of claim 37, which includes:
determining a tangential component of the determined displacement of the matching image elements; and
an angular distance traveled by the rotary assembly in the time lapse between the acquisition of the overlapping images by the tangential component of said determined displacement of the matching image elements.

39. The method of claim 37, which includes:
determining a radial component of the determined displacement of the matching image elements; and
determining a radial displacement of the rotary assembly with respect to the axis by the radial component of the determined displacement of the matching image elements.

40. The method of claim 39, which includes processing the angular distance to determine a plurality of events.

41. The method of claim 39, which includes processing the determined radial displacement of the rotary assembly with respect to the axis to determine a plurality of events.

42. The method of claim 36, which includes transmitting, via one of a cable or a radio signal, the determined displacement of the rotary assembly to a remote control centre.

* * * * *